United States Patent [19]

McCarty et al.

[11] Patent Number: 4,612,491
[45] Date of Patent: Sep. 16, 1986

[54] CHARGER FOR BATTERIES

[75] Inventors: George W. McCarty, Lutherville; Somers H. Smith, III, Columbia, both of Md.

[73] Assignee: Solid State Chargers Research & Development Limited Partnership, Lutherville, Md.

[21] Appl. No.: 750,473

[22] Filed: Jul. 1, 1985

Related U.S. Application Data

[63] Continuation-in-part of Ser. No. 598,580, Apr. 10, 1984, Pat. No. 4,527,110.

[51] Int. Cl.$^4$ .................. H02J 7/00; H01M 10/46
[52] U.S. Cl. ........................................ 320/2; 429/99
[58] Field of Search ........................... 320/2–4; 429/99, 100, 97, 98

[56] References Cited

U.S. PATENT DOCUMENTS

| | | | |
|---|---|---|---|
| 3,281,637 | 10/1966 | Hultquist | 320/2 |
| 4,086,523 | 4/1978 | Izumi | 320/2 |
| 4,096,428 | 6/1978 | Hanson et al. | 320/2 |

Primary Examiner—R. J. Hickey
Attorney, Agent, or Firm—Leonard Bloom

[57] ABSTRACT

A charger for batteries includes a a charging station, which includes a housing. A casing end having an open portion through which batteries to be charged are to be inserted is provided. A constant tension spring within the casing urges the batteries outwardly of the casing. A lid is provided adjacent to the open end of the casing, the lid being movably, pivotably supported on the casing. A stop member is provided on the housing, the stop preventing the lid from being moved to its completely open position when the casing is supported on the housing. A latch arrangement retains the lid in a closed orientation. The batteries in the casing are retained therein by a portion of the lid whenever the lid is pivoted away from its completely open position. Contact means are provided between the housing and casing to provide a path for charging current. A multiple of charging stations can be provided, the multiple stations being electrically and mechanically connected. Each charging station is adapted to support a respective casing.

11 Claims, 26 Drawing Figures

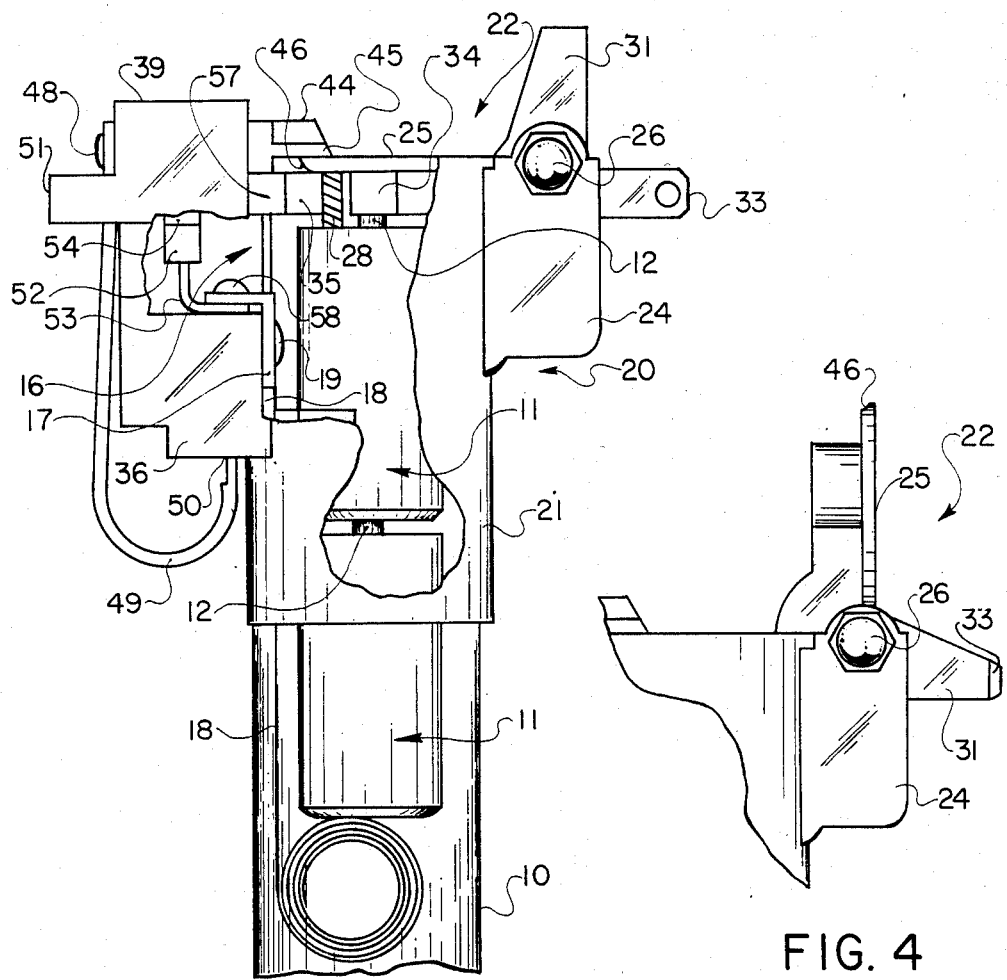
FIG. 3
FIG. 4
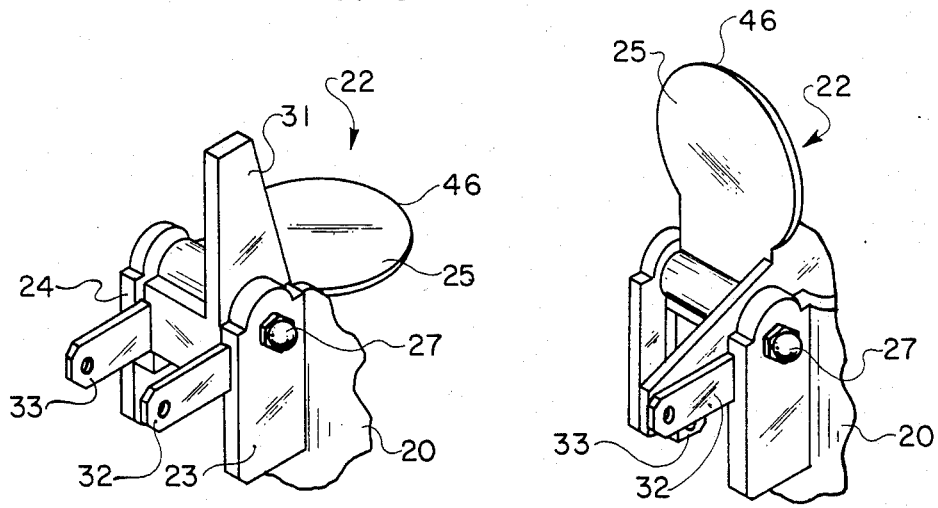
FIG. 5
FIG. 6

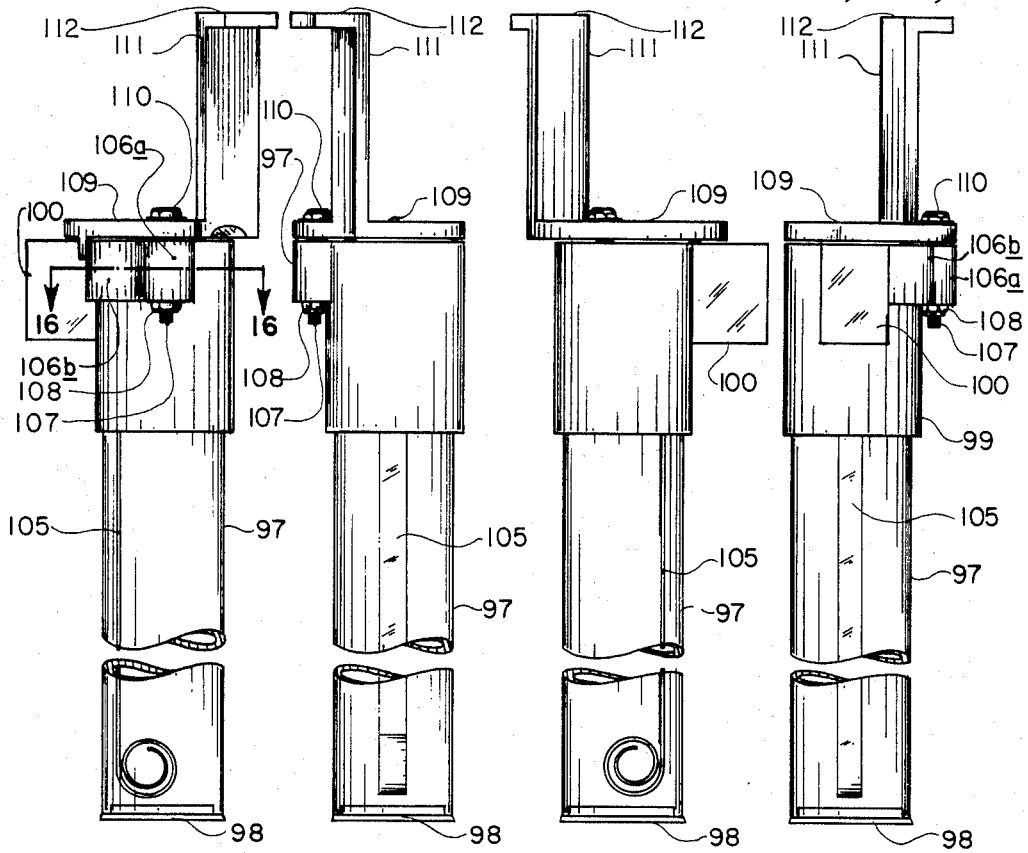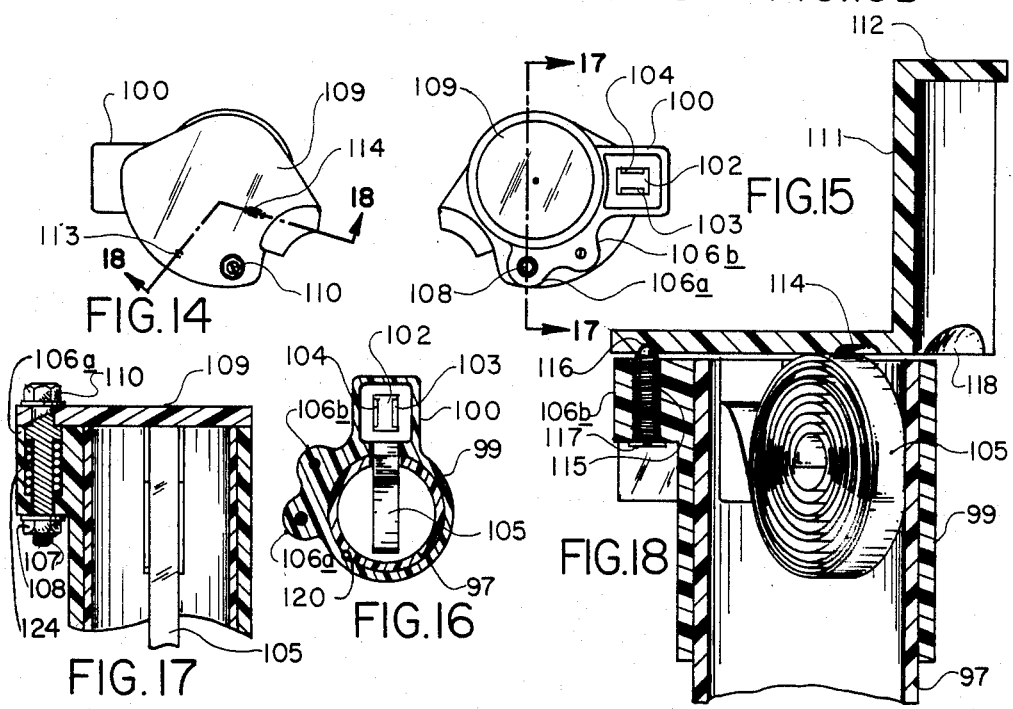

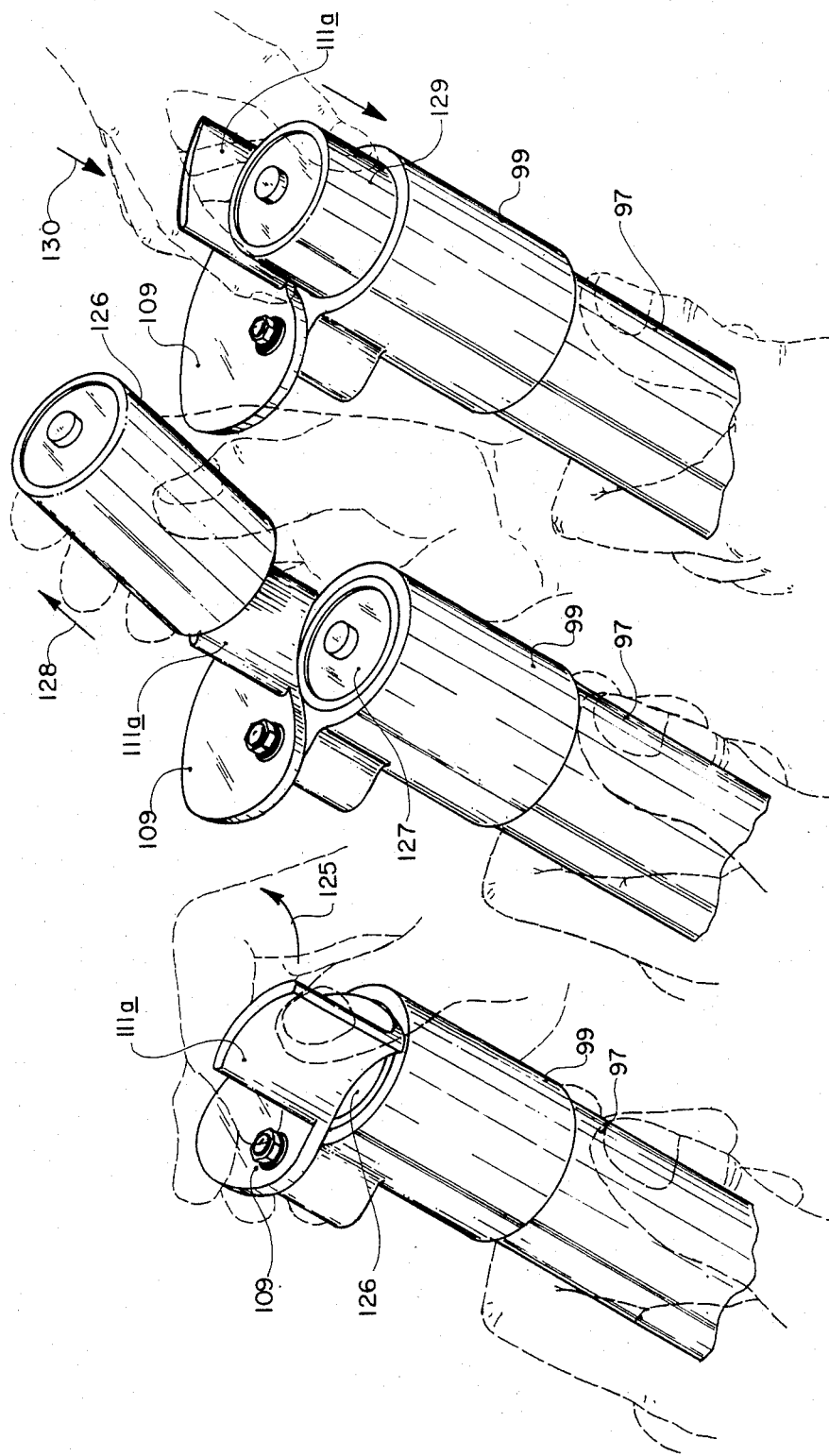

CHARGER FOR BATTERIES

CROSS REFERENCE TO RELATED APPLICATION

This application is a continuation-in-part of U.S. patent application Ser. No. 598,580 of George W. McCarty and Somers H. Smith III filed on Apr. 10, 1984, now U.S. Pat. No. 4,527,110, and entitled "Charger for Batteries", the disclosure of which is incorporated herein in its entirety by reference.

BACKGROUND OF THE INVENTION

This invention relates to a charger for batteries which has at least one charging station and includes a casing in which the batteries to be charged or recharged are positioned, conductive circuitry being provided within the casing to deliver charging current to the battery or batteries which may be positioned in same. The casing is supported on the charging station.

It is known from U.S. Pat. No. 4,009,429 issued Feb. 22, 1977 to Ferdinand H. Mullersman and entitled, "Charger With Multiple Attachable Cellholder Modules" to provide a battery charging arrangement which includes a housing having a pair of prongs extending therefrom adapted to be inserted into a conventional A.C. wall outlet. This system includes a charge current source constituted by a transformer arrangement within the housing. A plurality of electrical contacts extend from the housing and are adapted to cooperate with corresponding contacts which extend from a removable cellholder module which includes one or more rectifiers to provide a D.C. output to one or more single cell batteries which are supported by the module. The module, in turn, is supported by the housing which has the pair of prongs extending therefrom, both module and housing being supportable by the A.C. receptacle. Individual cellholder modules are provided for supporting different sized cells, for example, AA, C or D cells, depending on which size of cell a user wishes to have charged or recharged. Similar chargers for batteries are disclosed in respective U.S. Pat. Nos. 4,173,733, 4,319,178 and 4,409,536 issued respectively on Nov. 6, 1979, Mar. 9, 1982 and Oct. 11, 1983 to Raymond K. Sugalski et al., Raymond K. Sugalski and John M. Evjen.

It is known from U.S. Pat. No. 4,064,447 issued Dec. 20, 1977 to James E. Edgall et al., and entitled "Cordless Portable Electrically Powered Device" to provide in a cordless electrically powered device a removable a power pack which includes a housing within which batteries and a rectifying arrangement are positioned and from which a pair of contact prongs extend, when the housing is removed from the tool. The contact prongs are adapted to be inserted directly into a A.C. outlet receptacle so as to support the housing within which the battery pack is housed along with the rectifying arrangement so that the batteries in the housing may be recharged. Similar cordless electrical devices having removable power packs are disclosed in respective U.S. Pat. Nos. 4,084,123 and 4,191,917 granted respectively Apr. 11, 1978 and Mar. 4, 1980 to Lynn D. Lineback and Wayne R. Brown.

Of general interest as showing the background prior art are a number of additional U.S. patents identified as follows:

| U.S. Pat. Nos. | Inventor(s) | Issue Date |
|---|---|---|
| 2,642,520 | Roger S. Coolidge et al. | June 16, 1953 |
| 3,209,230 | Joseph A. Mas | September 28, 1965 |
| 3,261,973 | Herbert Kott | July 19, 1966 |
| 3,320,508 | Franklin C. Bradshaw et al. | May 16, 1967 |
| 3,360,708 | David Palmer-Person | December 26, 1967 |
| 3,391,321 | Hajime Ota | July 2, 1968 |
| 3,435,318 | Joseph A. Mas | March 25, 1969 |
| 3,473,859 | Paul J. Kircher | October 21, 1969 |
| 3,519,914 | Takayuki Fujimaki et al. | July 7, 1970 |
| 3,579,075 | Linton E. Floyd | May 18, 1971 |
| 3,629,680 | William R. Baynes et al. | December 21, 1971 |
| 3,696,283 | John W. Ackley III | October 3, 1972 |
| 4,086,523 | Koji Izumi | April 25, 1978 |
| 4,101,818 | William T. Kelly III et al. | July 18, 1978 |
| 4,205,121 | Yasuo Naitoh | May 27, 1980 |
| 4,206,274 | Henricus G. Peels | June 3, 1980 |
| 4,303,876 | William T. Kelly III | December 3, 1981 |
| 4,389,469 | Bryan F. Nicholls | June 21, 1983 and |
| 4,403,182 | Warner S. Yeh | September 6, 1983. |

SUMMARY OF THE INVENTION

An object of the present invention is to provide a charger for batteries which includes a casing and contact means, which cannot be brought into engagement with a source of power, when the casing is open to receive or to deliver a battery or batteries to be charged or recharged.

Another object of the present invention is to provide a charger for batteries which includes a constant-tension conductive spring means within its casing for the battery or batteries and which effects the holding of the one or more batteries to be charged or recharged in position and, at the same time, provides an electrical contact to the battery or batteries.

A further object of the present invention is to provide a charger for batteries with a latching arrangement which retains a lid for an open portion of the housing in its closed position.

Yet another object of the present invention is to provide a charger for batteries which includes means which effect the retention of the battery or batteries within the housing whenever the cover is in a partially open position.

Yet a further object of the present invention is to provide a casing for removably holding a battery or batteries to be charged or recharged, electrical contact means being provided to receive D.C. power from a charging station.

An additional object of the present invention is to provide a multistation modular battery charging system which can be used in conjunction with a corresponding plurality removable casings which are to hold batteries to be charged or recharged.

The invention can be seen as being a combination in a charger for batteries. The combination includes a charging station having a housing which has a longitudinal recess formed therein. A casing, which is to hold at least one battery to be charged or recharged, is adapted to be received within the recess. An upwardly projecting boss is provided on the charging station housing above the recess. A laterally-projecting guide is carried by the casing, the laterally-projecting guide having an open bottom end and being adapted to the supported on the upwardly-projecting boss on the charging station, thereby removably supporting the casing on the charging station housing. A lid is pivotably mounted on the casing, the lid can be pivoted to allow individual batteries to be inserted into or removed from the casing. Means including an element on the charging station housing and cooperating with the pivoted lid on the casing is provided to prevent the lid from being pivoted sufficiently, thereby precluding access to the interior of the casing when the casing is mounted on the charging station housing. Electrical connection means are provided between the charging station housing and the casing and includes electrical contacts within the boss and guide.

From another aspect, the invention can be viewed as being a combination in a charger for batteries. The combination includes a base charging station having a housing and means connecting the base charging station to a source of electrical power. A satellite charging station having a housing is removably connected to the base charging station housing. Means are provided for electrically connecting the base and satellite charger station housings in electrical series when the satellite charging station housing is mounted on the master charging station housing. A plurality of casings, which are to hold respectively at least one battery to be charged or recharged, are provided for each of the charging station housings, respectively. Means on each of the charging station housings support a respective one of the plurality of casings, each of the casings being adapted to receive a plurality of rechargable batteries. Electrical connection means are provided between each of the charging station housings and respective interiors of the respective casings for conducting charging current to batteries within the casings. Means are provided for precluding access to the interiors of the respective casings when a respective casing is mounted on its respective charging station housing.

In another aspect, the invention can be considered to be a combination in a battery charger, the combination including a casing adapted to receive a plurality of rechargable batteries. The casing has an open end through which batteries to be charged or recharged may be inserted into and be removed from the casing. A lid is pivotably mounted on casing and is adapted to close the open end of the casing, the lid having a closed position and a fully open position. First resilient means constantly urging the pivoted lid to its closed position is provided. Second resilient means are provided within the casing and constantly urges batteries when present in a direction outwardly of the casing. Respective means cooperate between the casing and the lid and are adapted to removably retain the lid in an intermediate position between its fully open and closed positions, thereby preventing batteries from being fully and inadvertently ejected out of the casing by the second resilient means when the lid is moved away from its closed position. When any present battery is being manually removed from the casing, the first resilient means moves the lid into its intermediate position in detented engagement with the casing, and wherein in its intermediate position, the lid automatically engages a portion of a next battery if present in the casing to preclude its inadvertent ejection out of the casing.

From yet another viewpoint, the invention can be seen as being a combination in battery charger, the combination of a charging station including a housing, a substantially longitudinal casing adapted to receive a plurality of rechargable batteries, the batteries including an innermost battery having a rearward end portion, means for removably supporting the casing on the charging station housing. Cooperating electrical connection means are provided between the charging station housing and the casing, respectively. A substantially constant tension spring is positioned within the casing for constantly urging the batteries out of the casing, means electrically connecting a first portion of the spring to the electrical connection means on the casing being provided. The spring further includes a coiled second portion formed integrally with the first portion of the spring and disposed against the end of the innermost cell within the casing.

The invention can be seen as a combination in a battery charger, of a casing having an open end through which the casing is adapted to receive a plurality of rechargable batteries and a substantially constant tension spring within the casing for constantly urging the batteries out of the casing. A movable lid is provided on the casing and has an open position and closed position over the open end of the casing. Resilient means constantly urge the lid to its closed position. Detent latching means are provided between the lid and the casing for retaining the lid in an intermediate position between its open and closed positions, thereby precluding all of the batteries from being inadvertently ejected out of the casing, but facilitating the selective removal of an individual battery out of the casing.

The invention can be viewed as a combination in a battery charger, the combination including a charging station with a housing and a substantially longitudinal casing having an open end through which the casing is adapted to receive a plurality of rechargable batteries. Means are provided for removably supporting the casing on the charging station housing. Cooperative electrical connection means are provided between the charging station housing and the casing, respectively. A substantially constant tension spring is positioned within the casing. Closure means for the open end of the casing have an open position and a closed position, the closure means including latching means to preclude batteries from being inadvertently ejected out of the casing, but facilitating the selective removal of one of the batteries out of the casing. Interlock means cooperate between the casing and the charging station housing and precludes the closure means from being moved to its open position, when the casing is supported on the charging station housing, to preclude access to the interior of the casing.

The invention can also be viewed as being a combination in a battery charger having a charging mode and a passive mode. The combination includes a tubular casing having an open end adapted to receive a plurality of rechargable batteries including an innermost battery having a rearward end portion. Resilient means, including a first substantially flat portion and a second coiled portion integral with the first portion end, engages the end of the innermost battery for constantly urging the batteries in a direction outwardly of the casing. Means preclude the plurality of batteries from being fully ejected out of the casing, but facilitate selective removal of batteries individually out of the casing. Means are provided for preventing access to interior of the casing when the charger is in its charging mode.

In a further aspect, the invention can be viewed as a charging for batteries which includes at least one charging station having a housing and at least one casing adapted to receive one or more batteries to be charged or recharged. Each casing is provided with a respective closure means which is movable between an open and closed position and a substantially constant tension spring means therein which urges batteries outwardly from the respective casing and also provides a conductive contact to batteries therein. Each charging station includes a respective boss, which supports its associated casing, and a respective stop which prevents the closure means from being moved to its open position. Detent means are provided between the casing and closure means for assuring that the closure means can be temporarily held in an intermediate position between its closed and open position, thereby preventing batteries from being inadvertently ejected from the casing.

BRIEF DESCRIPTION OF THE DRAWINGS

FIG. 3 is a side view of the charger for batteries illustrated in FIGS. 1 and 2 partially broken away, two batteries and a constant-tension spring being visible within the broken-away portion of the charger.

FIG. 4 is a side view of a portion of the charger for batteries shown in FIGS. 1-3, the cover for the open portion being shown in its open orientation.

FIGS. 5 and 6 are respective pictorial views of a portion of the battery charger illustrated in FIGS. 1-3, the cover for the open portion of the housing being illustrated respectively in its closed and open orientation.

FIGS. 13A-13D are respective plan views of one of the battery holding devices shown in FIG. 11, each successive view showing the device being rotated 90° clockwise with respect to the preceding view.

FIG. 14 is a top view of the battery holding device illustrated in FIG. 13A.

FIG. 15 is a bottom view of the battery holding device illustrated in FIG. 13C.

FIG. 16 is a cross sectional view of the battery holding device illustrated in FIG. 13A, the section having been taken along section line 16—16.

FIG. 16, 17 is a cross sectional view of the top portion of the battery holding device illustrated in FIG. 15, the section having been taken along section line 17—17.

FIG. 18 is a cross sectional view of the top portion of the battery holding device illustrated in FIG. 13A, the section having been taken along sections line 17—17 shown in FIG. 14.

FIGS. 19A-19C are respective pictorial views of a variant of the battery holding device illustrated in FIGS. 13A-13D, illustrating the manner in which batteries may be removed and inserted therein.

DETAILED DESCRIPTION OF THE PREFERRED EMBODIMENTS

Figures 1, 2:
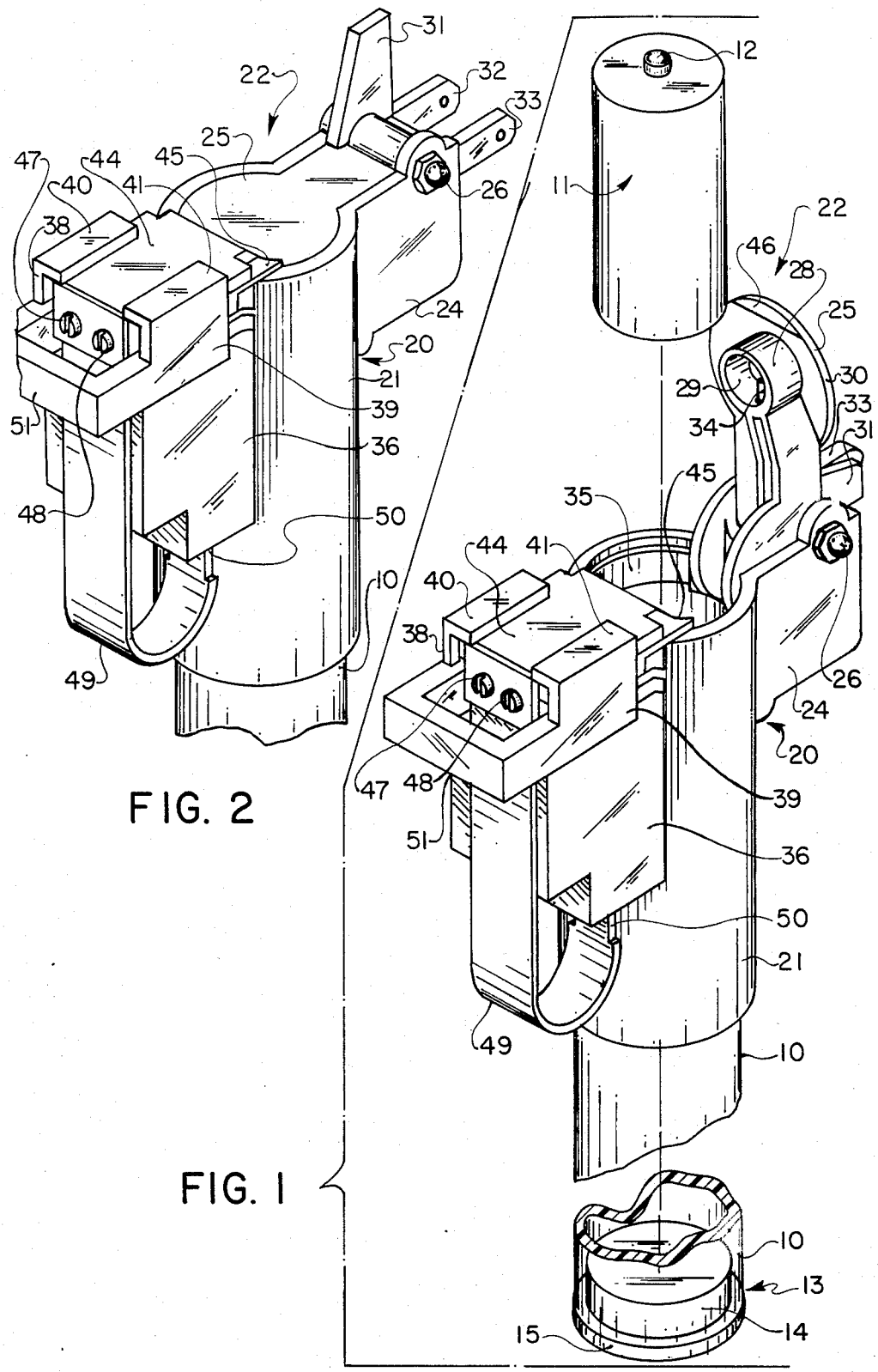
FIG. 1 is a pictorial view of a charger for batteries constructed in accordance with a first exemplary embodiment of the present invention, a cover for an open portion of the housing of the charger being shown in an open position.
FIG. 2 is a pictorial view of a portion of the charger for batteries illustrated in FIG. 1, the cover for the open portion of the housing being shown in a closed position.
Figure 7:
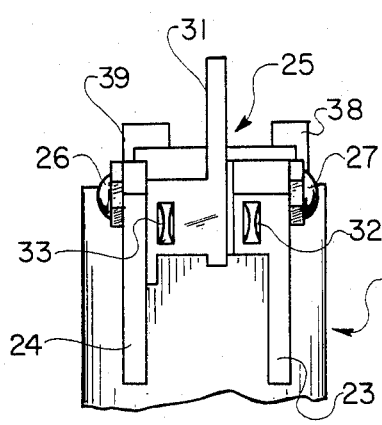
FIGS. 7 and 8 are respective side views of a portion of the charger for batteries illustrated in FIGS. 1-3, the cover for the opening in the housing being illustrated respectively in a closed and open orientation.
Figure 8:
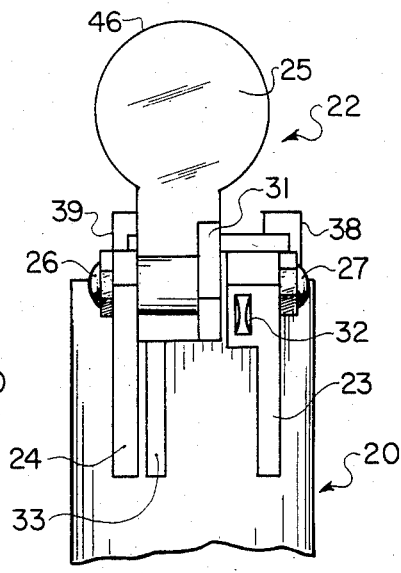

Referring to FIGS. 1-8, the exemplary embodiment of a charger for batteries constructed in accordance with the present invention includes a tubular, cylindrical member 10 preferably made of a transparent plastics material, such as material sold under the trade name Plexiglas or the like, and dimensioned so as to receive and stack, in an end-to-end, serial electrical connection rechargable batteries, such as nickel-cadmium batteries of various sizes as AA, C, and D, one such battery 11 being visible in FIG. 1, and two batteries 11 being shown within the cylindrical member 10 in FIG. 3. The cylindrical member 10 is sufficiently long to position therein up to five C cells or up to four D cells, for example, and yet not to be too heavy or have an unacceptable moment or an unacceptable center of gravity to meet requirements of Underwriters Laboratories, Inc. regarding weight and movement limitations, such as devices which can be safely supported by conventional A.C. wall outlet receptacles and the like. Each of the batteries 11 has a center post 12, which serves as the positive terminal of the respective batteries. The outside casing of the batteries 11 serve as their negative terminals.

The lower end of the transparent cylindrical member 10 is closed by a plug 13, made of a suitable plastics material, such as the material sold under the trade name Cycolac or the like, which has a first end portion 14 having a diameter corresponding to the inside diameter of the cylindrical member 10 and which is inserted into the cylindrical member 10. The plug 13 has an a second portion 15 having a diameter corresponding to the outside diameter of the tubular member 10, thereby providing an annular land against which an end of the cylindrical member 10 is positioned. The plug 13 is inserted into the tubular cylindrical member 10 during manufacture and is fixed thereto by a suitable conventional technique, such as application of an epoxy resin or the like.

The opposite end of the tubular member 10 is provided with a slot 16 (FIG. 3) which extends from its upper edge downwardly. An electrically conductive, bent metal strip 17 (FIG. 3) is provided in the bottom of the slot 16, one end portion of this conductive strip extending outwardly from the cylindrical member 10, the other end portion of the strip extending along the inner surface of the cylindrical member 16 approximately one inch. A constant-tension spring 18 is provided within the cylindrical member 10, one end of the constant-tension spring being fixed to the conductive strip 17 by a rivet 19. The rivet 19 serves to fix the constant-tension spring 18 in place, as well as provide an electrical connection from the conductive strip 17 to the spring. As best seen in FIG. 3 the constant-tension spring 18 is so positioned within the cylindrical member 10 so that cylindrical rechargeable nickel cadmium batteries, such as batteries 11, can be inserted one after another into the cylindrical member 10, the constant-tension spring 18 providing support for the batteries and positioning them within the cylindrical member 10 with their respective center, positive posts 12 facing upwardly, the constant-tension spring coming in contact with the outer casing of the lowermost one of the batteries 11, as shown in FIG. 3, to provide an electrical connection thereto, as well as mechanically to bias the batteries 11 toward the open, upper end of the cylindrical member 10 to aid in ejecting them and to position the post 12 of the uppermost one of the batteries 11 so that it may complete the charging circuit. A shaped member generally designated by the numeral 20, made of an electrical insulating plastics material or the like, such as the material sold under the trade name Cycolac, and having a substantially hollow, cylindrical portion 21 is positioned so that its cylindrical portion extends over and about the upper end portion of the cylindrical member 10 and beyond the upper edge thereof for a short distance, the upper edge surface of the cylindrical member 10 forming a land for receiving a cover 22 having a thickness corresponding to the depth of an annular extending recess defined by the land and the upwardly extending inner surface of the cylindrical portion 21.

The shaped member 20 includes a pair of spaced-apart outwardly extending supports 23 and 24 which are integral with the cylindrical portion 21. Near the upward portion of the supports 23 and 24 aligned apertures (not visible) are provided through the supports. The cover 22 includes a substantially flat circular portion 25 which has a thickness corresponding to the afore-mentioned annular extending recess so that the cover 22 can be readily seated on the land within the recess provided at the intersection of the inner surface of cylindrical portion 21 and defined by the upward edge of the cylindrical member 10. The cover 22 is pivotably mounted on a bolt 26 which extends through the aligned apertures in the supports 23 and 24, as well as through an axial bore extending through a peripheral portion of the cover 22 which is integral with the circular portion of the cover 22 which is seated within the annular extending recess. The end of the bolt 26 which extends outwardly from the aperture in the support 24 is conventionally secured by a nut 27 (FIGS. 7, 8) or the like.

Also integrally formed as part of the cover 22 is a centrally positioned, downwardly extending spacer 28 (FIGS. 1, 3) which also strengthens the cover 22 and includes centrally therein a bore 29. The downwardly extending spacer 28 of the cover 22 has a radially extending portion 30 through which a bore (not visible) extends and through which the bolt 26 passes. The bolt 26 provides a bearing surface for the pivotable movement of the cover 22 bringing the underside, peripheral portion of the cover 22 into and out of contact with the seat defined by the upper end edge of the cylindrical member 10 at its intersection with the inner surface of the cylindrical portion 21 of the shaped member 20. The cover 22 is pivotably rotatable by a user exerting thumb or finger force on an upwardly extending protrusion 31 which has an axis of rotation coincident with the axis of rotation of the bolt 26.

Figure 9:
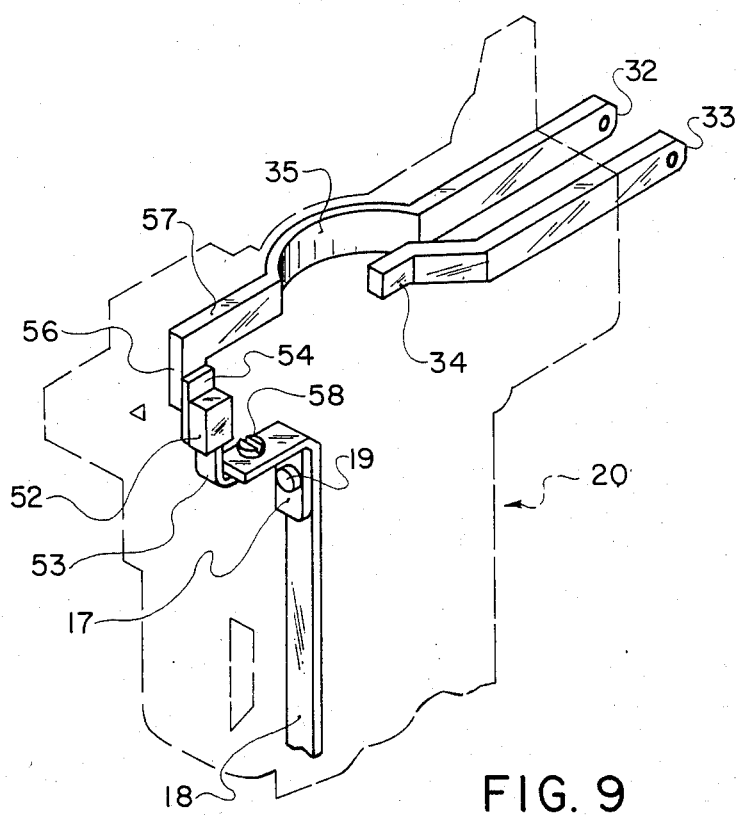
FIG. 9 is an electrical wiring diagram which illustrates the positioning within the charger of the solid-state, current pulse producing, rectifying circuit used in the charger and its electrical and thermal relationship to one of the prongs being illustrated, non-circuit portions being shown in phantom for the sake of clarity.

As illustrated, the battery charger includes a pair of contact prongs 32 and 33, the contact prong 32 extending through the support 23 and outward from a vertical surface thereof. The contact prong 32 is fixed with respect to the shaped member 20. The cooperating contact prong 33, which is spaced from the contact prong 32, extends through and outward from the radially extending portion 30 of the cover 22 and is fixed therein. The contact prong 33 is fixed within the cover 22, it having been molded or otherwise conventionally fixed therein. An end portion 34 of the contact prong 33 terminates within the bore 29 formed in the downwardly extending spacer 28 of the cover 22. The contact prong 33, as is readily apparent, pivots in conjunction with the cover 22 upon application of force by a user to the extending protrusion 31, which brings its end portion 34 into electrical contact with the post 12 of the uppermost battery 11 positioned within the cylindrical member 10 when the cover 22 is in its closed orientation over the upper end of the cylindrical member. The prong 32, which unlike the prong 33, does not rotate in conjunction with the pivoting movement of the cover 22 extends through the support 23 and includes, as best seen in FIG. 9, an arcuately bent portion 35 which is positioned within a groove near the upper end of the cylindrical portion 21 of the shaped member 20.

Also integrally formed with the cylindrical portion 21 of the shaped member 20 is a radially extending support 36 which has a substantially rectilinear recess 37 (FIG. 3) formed therein and includes a pair of upstanding vertical guides 38 and 39 formed thereon, the respective guides including respectfully inwardly extending end portions 40 and 41 which, with a flat horizontal surface of the support 36 extending between the guides define respective parallel grooves in which a flat, slidable substantially rectangular member 44, preferably made of the same material as the shaped member 20 is positioned. A radially inwardly facing surface of the slidable member 44 is constituted by a substantially circularly arcuate beveled surface 45 which slopes upwardly from the end surface of the cylindrical portion 21 of the shaped member 20. The arcuate surface 45 corresponds to the circular arc of that portion 46 of the edge surface of the circular cover 22 which is most distant from its pivotable axis defined by the bolt 26. The portion 46 of the edge surface of the cover 22 is also beveled and oriented so that, when it is brought into engagement with the surface 45 of the slidable member 44 and force exerted, it acts as a cam surface, the slideable member moving radially with respect to the cylindrical member 10. Opposite from the arcuate beveled surface 45, the slideable member 44 is provided with a vertical surface which includes two threaded bores (not visible) adapted to receive respectively screws 47 and 48 which fix one end of a resilient spring member 49 to the member 44. The other end of the spring member 49, which may be made of spring steel or of a resilient plastics material or the like, is fixably connected to the shaped member 20 in a groove 50 which is provided in a downwardly orientated surface of the radially extending support 36 of the shaped member 20 in the vicinity of the cylindrical portion 21 thereof. Extending outwardly from the radially extending support 36 in the vicinity of the screws 47 and 48 and straddling the spring member 49 is a U-shaped, integrally formed extension 51 which serves to protect the spring member 49 from external forces other than those imposed upon it by force exerted against the slidable member 44 either by a user directly exerting a force on the arcuate surface 45 in order to place the batteries 11 within the cylindrical member 10 or by the application of such force by pivotably moving the cover 22 to move its corresponding arcuate cam surface 46 into contact with the arcuate surface 45 in the course of closing the cover 22 and bring the end portion 34 of the contact prong 33 into direct contact with the post 12 of the uppermost one of batteries 11 within the cylindrical member 10.

As best seen in FIG. 3, an encapsulated solid-state circuit 52, preferably an integrated circuit which produces high current pulses in response to the application of an A.C. input to the contact prongs 32 and 33, is fixably positioned within the substantially rectilinear recess 37. An output terminal connection constituted by the first conductive tab 53 is conventionally conductively connected by a screw 58 or the like to one end of the metal strip 17, thus providing an output connection from the circuit 52 to the electrically conductive constant-tension spring 18 so as to supply current pulses to batteries, such as batteries 11, which are positioned within the cylindrical member 10. As shown in FIG. 3, the solid-state circuit 57 includes an input tab 54 which, as illustrated, is constituted by an extension of a heat sink of the solid-state circuit 52 which is encapsulated in a suitable plastics material, as is conventional. As best seen in FIG. 9, the input tab 54 is fixably connected by a conventional solder connection to a downwardly extending portion 56 of the contact prong 32 which is connected to the arcuate portion 35 of the prong 32 via a straight portion 57. Thus, the solid-state circuit 52 which supplies D.C. current pulses to the battery or batteries 11 sought to be recharged is both thermally and electrically connected to the contact prong 32.

It is to be appreciated that in some instances the thermal and electrical paths to the contact prong 32 from the solid-state circuit 52 should be separated, in instances where the input electrical connection to the solid-state circuit must be made at a portion other than where a heat sink may be provided. Any number of mounting arrangements for the solid-state circuit 52 are possible to effect appropriate suitable separate electrical and thermal connections. A number of possibilities are set out in the copending U.S. patent application No. 581,773 of George W. McCarty et al., filed Feb. 21, 1984 and entitled, "Solid-State Circuit Integrated With Prong of Molded Plug," the disclosure of which is incorporated herein in its entirety by reference.

Referring briefly to FIG. 9, the electrical circuit and its connections to the battery or batteries 11 sought to be recharged, as well as the positioning of these electrical components with respect to a non-conducting portions of the charger, which are shown in phantom, is illustrated. The prong 32 is connected, as pointed out above, to the solid-state circuit 52, via a series circuit constituted by the arcuate portion 35, straight portion 57 and vertical portion 56 thereof, and the input tab 54 (an extension of the heat sink). The output D.C. current pulses from the solid state circuit 52 are fed to the batteries 11 within the cylindrical member 10 via the series connection of the bent output tab 53, the bent metal strip 17 and the constant tension spring 18. The circuit is completed to the other one of the contact prongs, that is, prong 33, when the cover 22 is in its closed orientation, which brings the end portion 34 of the contact prong 33 into contact with the post 12 of the uppermost one of the batteries 11 within the cylindrical member 10.

It is to be noted that whenever the cover 22 is in its open orientation, the charger for batteries cannot be inserted into a wall outlet or the like because the two contact prongs 32 and 33 would not be properly aligned.

When the cover 22 is in its open orientation (FIG. 1), the spring 49 mechanically biases the slidable member 42 radially inward with respect to the axis of the cylindrical member 10 and beyond its lip as shown in FIG. 1, thereby retaining the batteries 11 therein in the absence of a user intentionally exerting force on the slidable member 44 to move it away from the lip so that batteries can be inserted into or removed from the cylindrical member 10. When the cover 22 is in its closed orientation (FIG. 2), the spring 49 biases the slidably member radially inward with respect to the cylindrical member 10 and over a peripheral portion of the cover 22 thereby retaining the cover closed and assuring that the contact prongs 32 and 33 are aligned so that they may be inserted into a conventional A.C. wall receptacle or the like.

Figure 10:
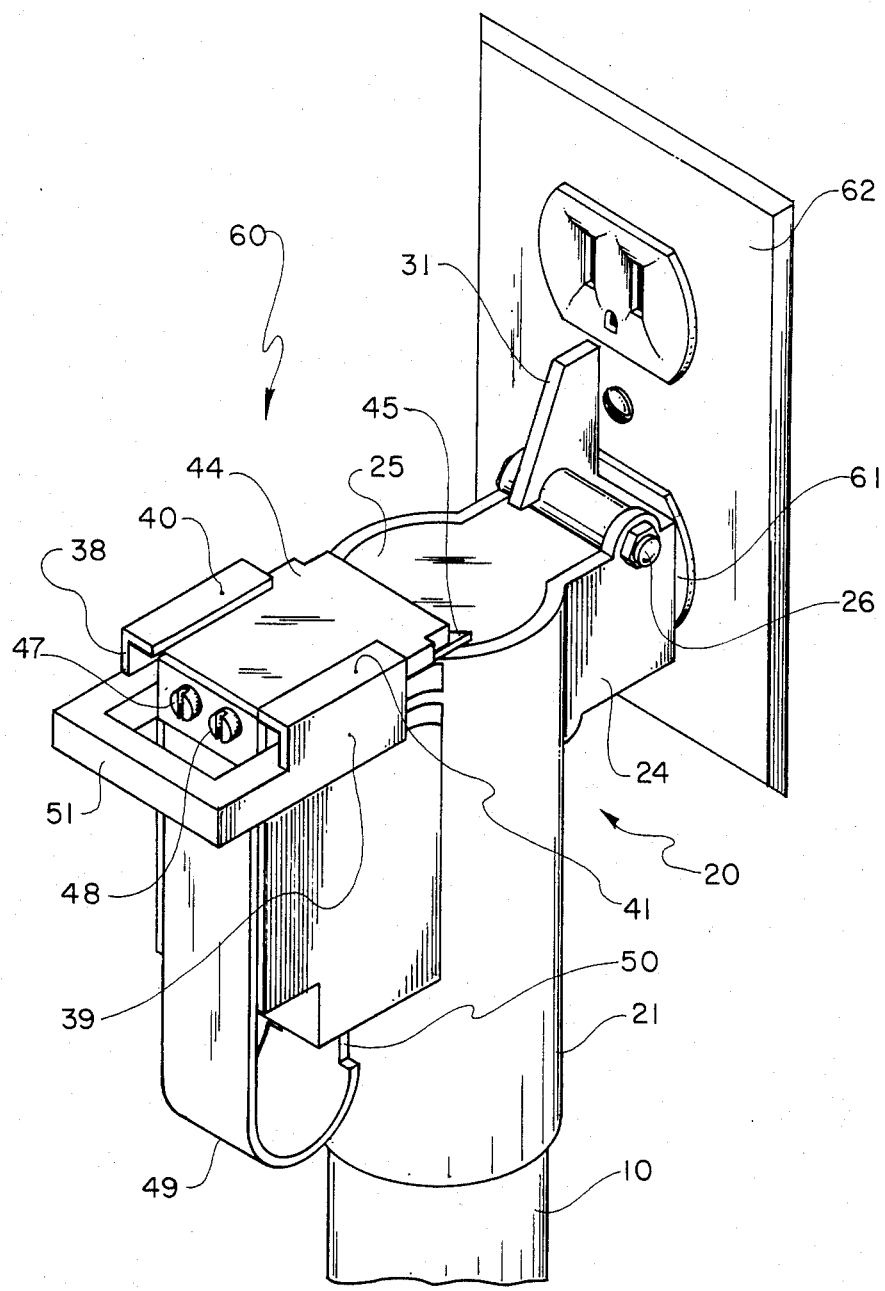
FIG. 10 is a pictorial view of a charger for batteries constructed in accordance with the present invention illustrated as being directly supported by a conventional A.C. wall receptacle.

Turning briefly to FIG. 10, a charger for batteries constructed in accordance with the present invention is generally designated by the numeral 60 and illustrated as being supported by a conventional A.C. wall receptacle 61 which is accessible through an aperture in a conventional cover plate 62, a second A.C. receptacle being present, as is conventional.

The shaped member 21 of the charger 60 for batteries is positioned with its contact prongs (not visible) inserted into the receptacle 61 so that the charger is supported thereby. The cylindrical member 10, as shown in FIG. 10, is relatively short, being sufficiently long to receive four D size cells or five C size cells and comply with the plug-in battery charger standards of Underwriters Laboratories, Inc., in particular the UL 1236 standards relating to maximum weight, movements and center of gravity (see UL 94, pg. 46F, Feb. 20, 1980). The other members of the charger 60, visible in FIG. 10, correspond to the members having the same numerals as the embodiment shown in FIGS. 1 and 2.

Figure 11:
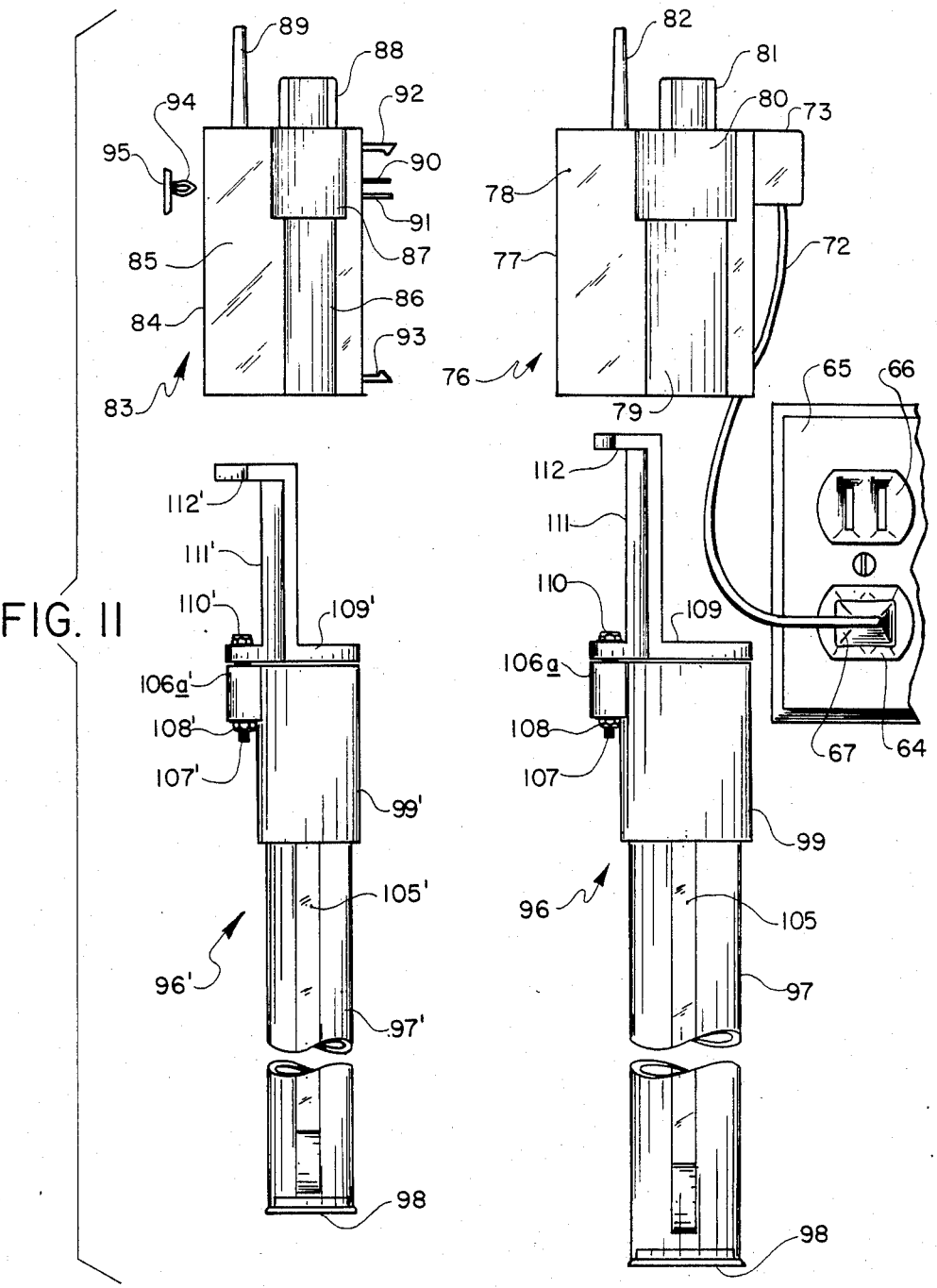
FIG. 11 is a front, plan view of a charger for batteries constructed in accordance with a second exemplary embodiment of the present invention, two charging stations and two battery holding devices being illustrated.

As illustrated in FIG. 11, a charger for batteries in accordance with the exemplary second embodiment of the present invention is shown in conjunction with a conventional A.C. wall receptacle 64 which is accessible via a conventional cover plate 65, a second conventional A. C. receptacle 66 being visible.

Figure 12:
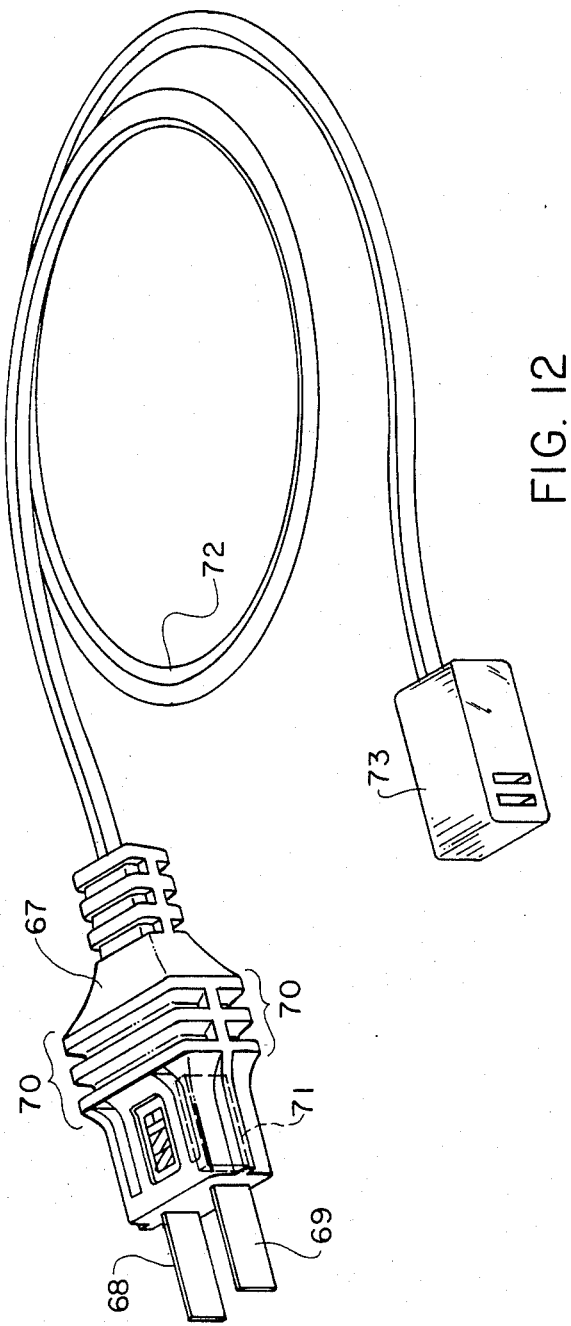
FIG. 12 is a pictorial view of the cord and power plug of the charger for batteries illustrated in FIG. 11, the position of d.c. current pulse producing, circuit within the power plug being shown.

The charger for batteries shown in FIG. 11 includes a moulded power plug 67, illustrated in greater detail in FIG. 12, having a pair of prongs 68, 69 (FIG. 12) suitable for insertion into the conventional A. C. receptacle 64. The power plug 67 is provided with heat dissipating fins 70 (FIG. 12). Moulded within the plug 67 is a D. C. charging current pulse producing circuit 71 (FIG. 12) which is advantageously positioned in thermal communication with the prong 69 which, in addition to supplying input power to the circuit 71 serves to dissipate heat from the circuit 71, preferably realized as an integrated circuit. A power cord 72 extends from the plug 67 to a moulded rectangular plug 73 which has a pair of internal current carrying contacts accessible via rectangular openings 74, 75 (FIG. 12) into which a cooperating pair of male prongs (not visible) carried by a base charging station 76 are inserted to receive the D.C. current pulses supplied from the pulse producing circuit 71. The D.C. current pulse producing circuit 71, the power plug 64 and the power cord 72 are preferably constructed as disclosed in the copending U.S. patent application Ser. No. 682,196 of Phillip A. Hoffman, filed Dec. 17, 1984 and entitled "Current Pulse Producing Circuit with Series Resistance", the disclosure of which is incorporated herein in its entirety by reference.

The power cord 72 preferably includes a pair of leads made of resistive wires and the D.C. current pulse producing circuit 71 is desirably housed within the plug 67, as disclosed and illustrated in the Hoffman, Ser. No. 682,196, supra, application. It is to be understood that the D.C. current pulse producing circuit could be positioned within the base charging station 76. In this case, the resistive wires would be replaced by resistors, possibly variable resistances, which would be positioned and carried within the housing of the charging station 76, and the cord 72 and the plug 64 would be replaced with a conventional A.C. power cord and plug. Other types of D.C. current pulse producing circuits could be used.

As shown in FIG. 11, the base charging station 76 includes a housing, designated generally by the numeral 77, having therein electrical conductive circuit components (not visible in FIG. 11) for carrying the D.C. charging current pulses, these components being illustrated in detail in FIG. 21, which is to be described in detail herein below.

The housing 77 of the base charging circuit station 76 is made of a suitable electrically insulating plastics material, such as the material sold under the tradename Cycolac or the like. The housing 77 includes a front flat surface 78 in which two longitudinally extending, axially aligned recesses 79 and 80 are provided. These recesses 79 and 80 are semi-circular in cross section, the upper recess being the larger in diameter. Also integrally formed with the housing 77 is an upstanding boss 81, of substantially rectangular cross section, the boss 81 having an axially extending bore (not visible in FIG. 11) therein. The boss 81 extends upwardly from the top major surface of the housing 77 adjacent to or in the vicinity of the edge of the recess 80. Also, integrally formed with the housing assembly 77 is a stop 82 which extends upwardly from the top major surface of the housing 77 for a distance somewhat greater than the upward extent of the boss 81, the stop 82 being spaced from the boss 81. A pair of female contacts (not visible in FIG. 11) provided within the housing 77 so as to allow electrical connection to satellite charging stations, one such charging station being illustrated in FIG. 11. The satellite charging station 83 is constructed similarly to the base charging station 76, the station 81 including a housing 84 of substantially rectangular configuration and including a flat front surface 85 having two respective axially extending aligned recesses 86 and 87 having semi-circular cross sections, the upper more recess 87 having the larger diameter. A substantially rectangular boss 88 and an upstanding stop 89 are provided; these members extend upwardly from and are made integrally with the upper surface of the housing 84. A pair of electrically conductive prongs 90 and 91 extend outwardly form that side of the housing 84 shown to the right in FIG. 11 so that the satellite charging station 83 can be brought into electrical connection with cooperating female contacts (not visible in FIG. 11), which are accessible, via apertures in that side surface of the base charging station housing 77. A pair of tabs 92 and 93, preferably formed integrally with the housing 84, extend perpendicularly and outwardly from that side surface of the housing 84 illustrated to the right. These tabs 92 and 93 are formed so as to have some resiliency; thus they may be inserted into the corresponding, cooperating apertures in the left side of the housing 77 of the base charging station 76 and mechanically connect and support the housing 84 on the housing 77. The base charging station 76 and the satellite charging station 83, as well as additional charging stations, if present, may be connected together as disclosed in the co-pending patent application of George W. McCarty et al. filed under Ser. No. 682,195 on Dec. 12, 1984 and entitled "Multi-Station Modular Charger for Cordless Tools and Appliances", the disclosure of which is incorporated herein in its entirety by reference. It is to be understood that the satellite housing 84 of the satellite charging station 83 is provided with a pair of female contacts which are accessible from its side showing to the left in FIG. 11 so that other satellite charging station housings can be electrically connected in series with the housing 84. The side of the housing 84 of the satellite charging station 83 is provided with respective bores arranged to receive additional spring tabs, which correspond to the spring tabs 92 and 93 of a further satellite charging station housing, if one desires to connect more than two of the charging stations together. In each case, a suitable electrically conductive member, such as the U shaped conductive member 94, carried by an insulating support 95, can be inserted into the female contacts of the last one of the satellite charging station housings so as to complete the series charging circuit of the interconnected charging stations. This particular U-shaped conductive member 94, or an equivalent thereof, also could serve as a on-off switching device for the interconnected charging stations.

The respective base charging station 76 and the satellite charging station 83, as illustrated in FIG. 11, are intended to be brought into operative engagement with respective battery carrying casings 96 and 96', which are of substantially identical construction, except for the respective sizes thereof. The casing 96 is dimensioned so that it may hold in end-to-end relationship a plurality of single cell rechargeable batteries of the D size while the housing 96' is dimensioned so as to hold in end-to-end relationship a plurality of rechargeable, single cell batteries of C size. It is to be understood that other size batteries could be accommodated in correspondingly dimensioned casings, such as AA size single cell, rechargeable batteries. Those portions of the casing 96' and components thereof which correspond to similar portions and components of the casing 96 are provided with the same reference numerals, respective prime signs being added.

The details of construction of the casing 96 and its associated cooperating members is to be described in detail, reference being made to FIGS. 13A–13D and 14–18, as well FIG. 11. The casing 96 includes a tubular cylindrical member 97 preferably made of a transparent plastics material, such as a material sold under the tradename PLEXIGLAS, or the like, and dimentioned to receive in stacked, end-to-end relationship rechargeable single cell batteries, such as Ni Cad batteries of, for example, size D. The cylindrical member 97 is sufficiently long to position within up to four or more D size cells in an end-to-end relationship. The member 97 is a preferably transparent so that a user may determine by visual inspection whether or not any batteries are present within the casing 96.

The lower end of the transparent cylindrical number 97 is closed by a plug 98 made of suitable plastics material, such as a material sold under the tradename Cycolac or the like, which has a first end portion having a diameter corresponding to the inside diameter of the cylindrical member 97. The plug 98 has an end portion which has a diameter corresponding to the outside diameter of the tubular member 97, thereby providing an annular land on which an end of the cylindrical member 96 is positioned. The plug 98 is inserted into the tubular cylindrical member 97 during manufacture and is fixed there to by a suitable conventional technique, such as the application of an epoxy resin or the like. A tubular member 99 having a cylindrical bore therein is positioned over the opposite end of the tubular member 97, its inner diameter corresponding to the outer diameter of the member 97. The member 99 is made of a suitable electrical insulating plastics material, such as the material sold under the tradename Cycolac or the like. The members 97 and 98 can be fixed to one another by a suitable epoxy resin or the like. As shown in FIG. 16, the two members 97 and 99 have a metallic member such as a set screw 120 extending into adjacent abutting surfaces of the cylindrical members 97 and 99 so as to assure that these members are appropriately aligned and to provide some restraint against rotation of one within the other.

Formed integrally with the substantially tubular, cylindrical member 99, about its periphery, near its top portion, is a radially extending, substantially rectangular guide 100 having substantial rectangular closed bore 101 therein, the bore 101 being open at its bottom, as best seen in FIGS. 15–16. A post 102 extends downwardly from the closed end of the bore 101, the post 102 being centrally located and carrying fixed electrical contacts 103 and 104 on opposite sides thereof. The internal dimensions of the guide 100 are such that the boss 81 (FIG. 11) will fit into the bore 101 and support the casing 96 on the housing 77 of the base charging unit 76, with the respective cylindrical members 97 and 99 resting in the respective semi-circular recesses 79 and 80 formed in the surface 77 of the base charging station.

When the guide 100 is position over the boss 81, the fixed contacts 104 and 103 are brought into respective electrical connection with a pair spring contacts 121 and 122 (FIG. 20) carried within the axially extending centrally located bore 123 within the boss 81. The spring contacts 121 and 122 are in contact with one another unless the guide 100 is positioned over the boss 81. Thus, it can be seen that when the guide 100 is removed from the boss 81, the spring contacts 121 and 122 contact one another thereby completing the series circuit formed by the various charging stations, whenever the casing 96 is removed.

A constant tension, electrically conductive spring 105 is positioned within the casing 96, the constant tension spring being shown in FIGS. 13A–13D in its extended position, where it would be were a series of single cell batteries to be charged and recharged placed within the tubular member 97. (For the sake of clarity the batteries are not shown in FIGS. 13A–13D.) The constant tension spring is shown in its shortest position in FIGS. 16 and 17, a position which it would assume were no batteries to be charged present within the casing 96. When the constant tension spring 105 is in the position shown in FIG. 18 its uppermost surface area contacts the conductive strip 151 (FIG. 21) thereby providing a conductive circuit connection, in the absence of batteries within the casing 96. As best seen in FIG. 21, the constant tension electric conductive spring 105 has one end fixedly positioned and arranged to be in electrical communication with the electrical contact 103 carried by the downwardly extending post 102 so as to provide a conductive member for supplying D.C. current pulses to the batteries which may be positioned end-to-end within the casing 96.

Angularly removed from the guide 100, but also extending radially outward from the upper portion of the member 99 are protrusions 106a and 106b. A bore extends through the protrusion 106a in an axial direction parallel to the axis of the cylindrical member 99. The details of the construction of the the bore and a spring and associated washers which cooperate therewith can be best seen in FIG. 17, to which further reference will be made herein below. A bolt 107 extends through the bore within the protrusion 106a, the bolt being provided with a nut 108 on its distal end. Aligned with the bore within the protrusion 106a is a bore within a lid 109, the bolt 107 extending through this bore as well, its head 110 being visible over the surface of the lid 109. The bolt 107, with its associated washers and a coil spring 124 serve to provide an axis about which the lid 109 can be rotated simply by bringing one's hand into forcing contact with an upstanding elongated tab 111 which is formed integrally with the lid 109. A radially extending protrusion 112 extends outwardly from the tab 111, the outwardly extending protrusion 112 serving to prevent batteries from being forcibly ejected from the casing 96, while allowing a single battery which has been forced out of the casing 96 by the resilient constant tension spring 105.

The upper surface of the lid 109 is flat, its bottom surface, being provided with a semicircular indentation 113 (FIGS. 14, 17), which functions as a detent and a spaced apart short grove 114, which also functions as a detent, having a width corresponding to the diameter of the semicircular indentation 113. The protrusion 106b, like the protrusion 106a, is provided with a axially extending bore which is parallel to the axis of the tubular cylindrical member 97. As best seen in FIG. 17, a compression spring 115 is positioned within the bore which runs through the protuberence 106b and carries it one in thereof, in captured engagement, a spherical bearing member 116. A threaded, flat-ended screw 117 is threadedly engaged in the lower end of the bore within the protuberence 106b so as hold the spring 115 and its associated spherical bearing member 116 in operative position. When the lid 109 is in its fully closed position, the bearing member 116 engages in the recess 113 and holds the lid 109 against rotation about its pivoting axis defined by the bolt 107 and the bore within the protuberence 106a. The groove 114 is dimensioned and positioned so that when the lid 109 is rotated partially towards its open position, the bearing member 116 becomes engaged in the groove 114, prior to the lid being completely moved to its open position. When the spherical bearing member 116 is positioned in the groove 114, the edge of the lid 109 engages a rim portion of whatever battery may be adjacent to the open end of the cylindrical member 97 because of the force provided by the constant tension spring 105. In this position, the battery cannot be removed by action of the spring 105 because at least its edge portion remains engaged with the lid 109. An additional recess 118 (FIG. 17) is provided in the lower surface of the lid 109, in the vacinity of the finger-engaging tab 111, this shaped recess 18 being provided so that when the lid 109 is swung towards its open position, the upwardly extending post of a battery positioned by action of the constant tension spring 105 in its uppermost position will enter the recess 118 and the rim portion of such a battery engaged the lower surface of the lid 109.

Turning briefly to FIGS. 19A-19C, a variant of the casing which is to hold batteries which are to be charged or recharged is illustrated, the difference being in the construction of the hand engageable tab associated with the lid 109. As shown in FIGS. 19A-19C, the integrally formed tab which extends upwardly from the upper surface of the lid 109 is constructed without having an emergency stopping extension associated therewith. A tab designated as 111a is of lesser vertical extent than the length of the single cell rechargable batteries which may be positioned within the tubular cylindrical member 98. Were one to wish to remove one or more batteries from the cylindrical member 97, one would simply grasp the cylindrical member 97 in one's left hand, shown in phantom, and using one's thumb in contact with the upstanding tab 111a, pivot the lid 109 about its pivoting axis defined by the bolt 107 in the direction of the arrow-headed line 125. When the lid 109 reached its completely opening position, one would simply release the lid 109 and grasp the uppermost battery 126 between the thumb and fingers of the right hand and begin to slowly remove it in the direction of arrow-headed line 128 from its protruding position caused by action of the constant tension spring 105 (not visible in FIGS. 19A-19C). The action of the coiled spring 124 within the protuberence 106a tends to move the lid 109 in the direction of its closed position, once one has released pressure from the tab 111a. As a result, the lid 109 rotates in a clockwise direction for a short distance, causing a portion of the lid to extend over the rim of the next single cell battery which has been pushed upwardly by the spring 105. Thus, the next battery 127 is retained within the cylindrical member 97. Where one to wish to insert batteries into the tubular, cylindrical member 97, one would simply grasp a battery 129 in one's right hand between thumb and fingers, bring its curved outer cylindrical surface into contact with the complementing curved surface of the tab 111a and with gentle pressure, move the lid 109 a few degrees in the counterwise direction, clearing its near edge portion from the rim of any battery which still may be present within the cylindrical member 97 and insert the battery 129 by moving it in the direction of the arrow-headed line 130, and thereafter bring the lid 109 to its closed position.

Figure 20:
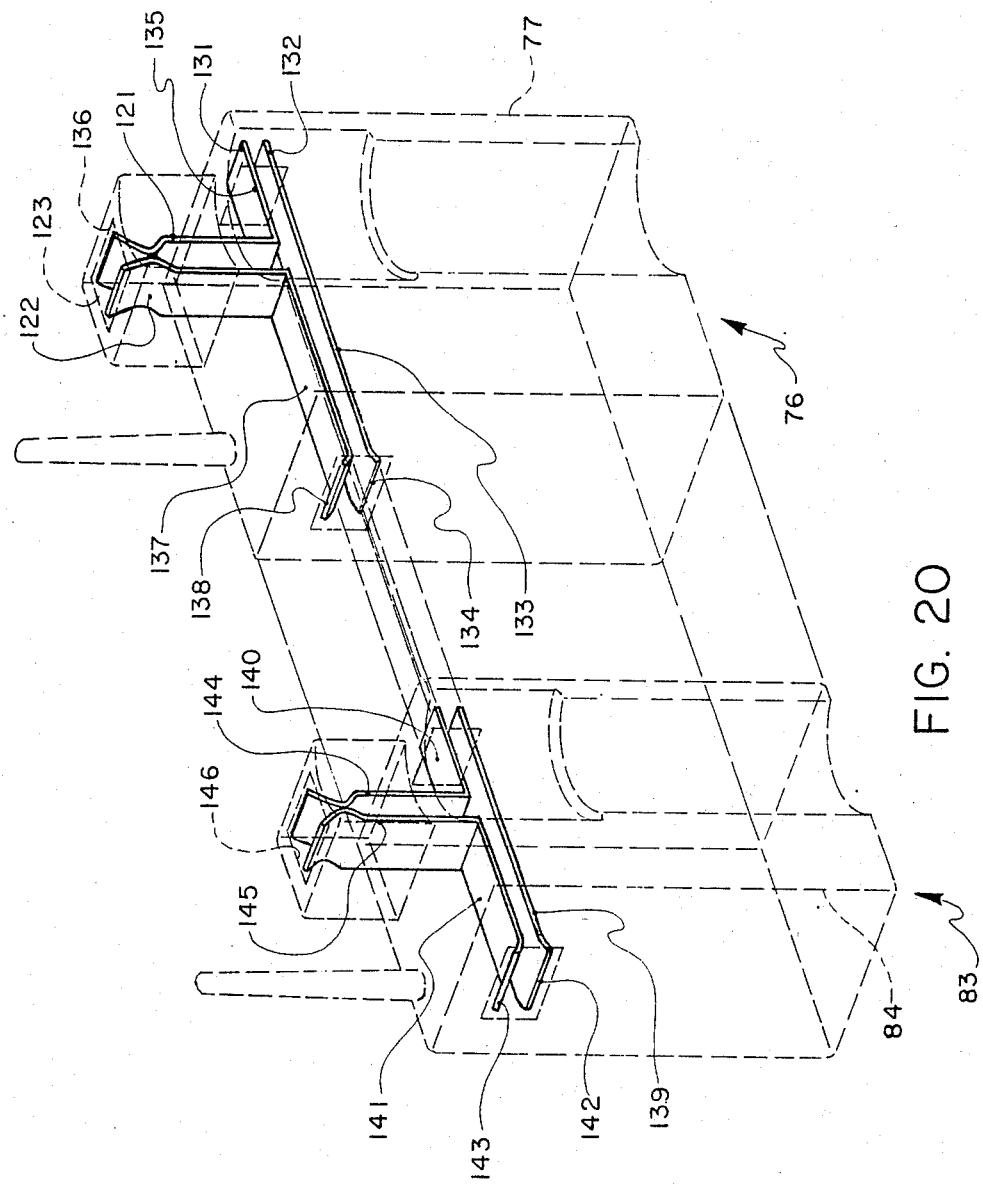
FIG. 20 is a pictorial view of the electrical circuit components within the battery holding device of FIGS. 13A-13D, the device being shown in phantom, except for the structure which supports the contact electrodes and spreads contacts within a charging station.

Turning briefly to FIG. 20, the D.C. current pulse carrying circuit components within the base charging station 76, which is shown in phantom, includes the prongs 131 and 132 which extend outwardly from the right side wall of the base charging station and which are to be brought into contact with cooperating contacts within the plug 73 (FIGS. 11, 12), are illustrated. The prong 132 is integral with a laterally extending flat bus 133 which has a slightly flared, downwardly extending end portion 134, which terminates within the housing 77 opposite an aperture in the left side wall of the housing. The prong 131 is integral with a laterally extending bus 135 which is bent upwardly to define a vertical portion of the spring contact 121 within the central bore 136 of the boss 81, the distal end of the vertical portion of the spring contact 121 being further bent toward the central portion of the bore 136. A further bus 137 is fixedly positioned within the housing 77 of the base charging station 76. The further bus 137 being positioned in parallel to the bus 133 and having an upwardly extending, flared end portion 138 opposite the aperture in the left wall of the housing 77. The other end of the bus 137 is bent upwardly and extends into the bore 136, its distal end within the bore 136 being bent toward the center portion of the bore to define the second spring contact 122 which, as shown, contacts the spring contact 121.

The satellite charging station 83 is provided with respective aligned rectangular apertures in its right and left walls. Respective ends of buses 139 and 140 within the housing 84 of the charging station 83 extend outwardly from the aperture in its right side wall and, when the charging stations 83 and 76 are brought into mechanical engagement, effected by the resilient tabs, (FIG. 11) and cooperating surfaces within the associated base charging station, make electrical contact with the flared end portions 134, 138 of the buses 133 and 137, respectively.

The distal end of the bus 139, which is flared downwardly, is positioned within the housing 84 of satellite charging station 83 opposite the aperture in its left side wall. A further bus 141, is positioned in parallel to the bus 139 and is provided with an upwardly extended flared end portion 142 opposite the aperture in the left side wall and the upwardly flared portion 143 of the bus 141. The buses 141 and 140 include respective, upwardly extending bent portions 144 and 145 within a rectangular bore 146 within the boss 88, their respective ends being bent inwardly to define respective spring contacts, which contact one another, unless a contact-bearing guide which corresponds to guide 100 is placed over the boss 88, spreading these spring contacts and placing batteries in series with these contacts.

As illustrated in FIG. 11, a plug 95, which carries the conductive spring contact 94 (not shown in FIG. 20) is to be positioned between the flared ends 142 and 143 of the buses 139 and 140 to complete the series circuit. It is to be understood that a plurality of satellite charging stations could be connected end-to-end, if one wishes to have more than two satellite stations; in this case the spring contact 94 would be associated with the last station.

Figure 21:
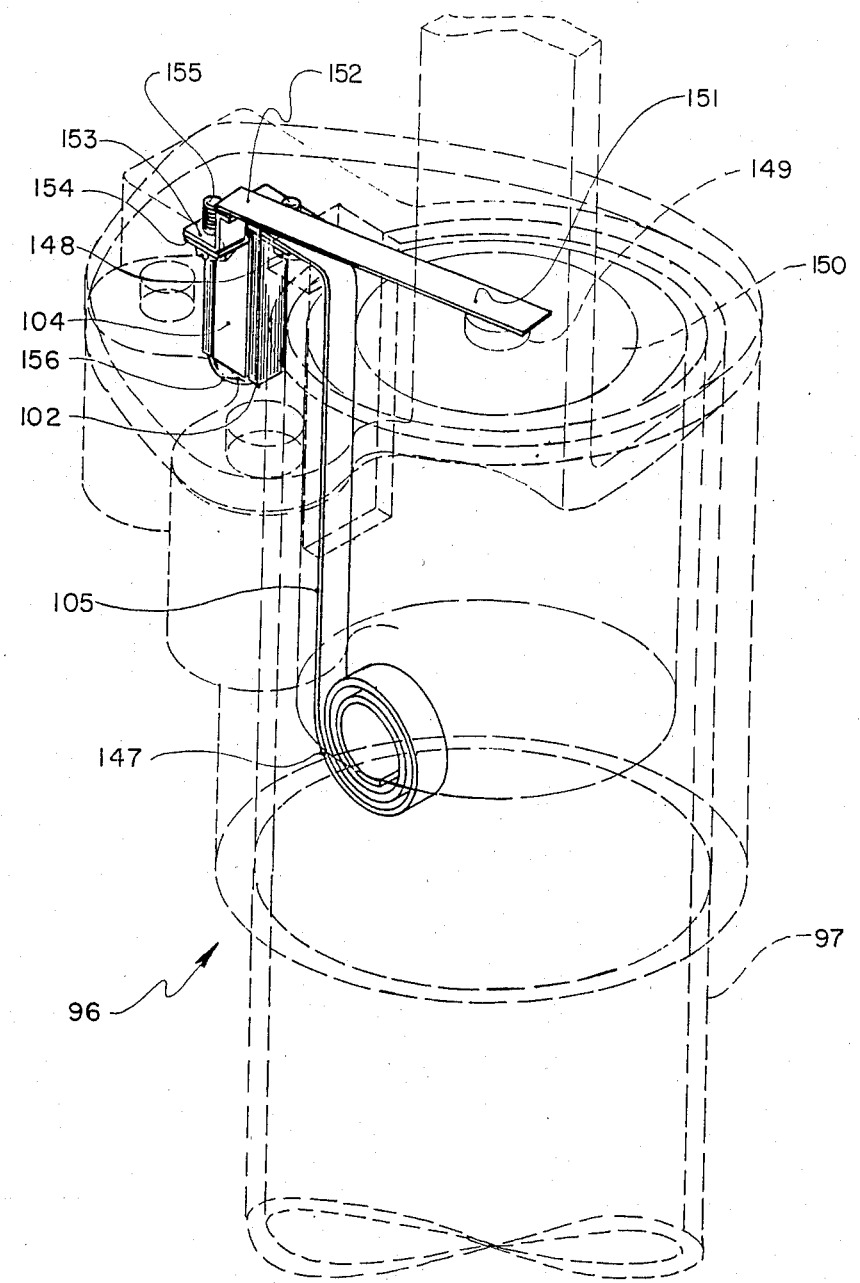
FIG. 21 is a pictorial view of the electrical circuit components within a base charging station and a satellite charging station, the stations being shown as exploded from one another and in phantom, except for the structure which supports the contacts which are to contact the contact electrodes within a battery holding device.

FIG. 21 illustrates the electrical circuit components within the casing 96, shown in phantom, the components include the conductive, constant tension spring 105, its free rolled end portion 147 being suitable for engaging single cell, rechargable batteries (not shown) and urging such batteries upwardly within the tubular, cylindrical member 97. The other end of the spring 105 is connected to the electrode 103 (FIGS. 15 and 16), but not visible in FIG. 21, the connection being effected via a conductive plate to which the fixed end of the spring 105 is connected by a screw 148. The electrode 103 is fixedly positioned opposite the electrode 104 which is fixedly positioned in parallel therewith on the post 102, which is integral with the guide 100. The center post electrode contact 149 of a battery 150, when positioned within the member 97, is brought into contact with a conductive strip 151 carried on or in the lower surface of the lid 109 and movable therewith. An end portion 152 of the strip 151 is in sliding contact with a bent extension 153 which, in turn, is held in conductive contact with an extension 154 of the electrode 104 by a screw 155.

Whenever the guide 100 is brought into engagement with the boss 81, the post 102 extends downwardly between the spring contacts 121 and 122, a shaped end 156 of the post 102 serving to spread the spring contacts 121 and 122. Thus, the contact between the spring contacts 121 and 122 is broken and batteries within the cylindrical member 97 are brought into the circuit in a series circuit arrangement.

It is readily understood that the spring contacts 144 and 145 within the satellite charging stations 83 can be similarly disengaged by positioning a corresponding guide over its boss, thereby placing various numbers of batteries in series with the D.C. current, pulse charging circuit.

It is to be appreciated that the circuit of the present invention could be advantageously provided with a fuse to prevent overload damage and an appropriate on-off switch.

It is to be understood that the foregoing detailed description, when taken in conjunction with the accompanying drawings relate to exemplary embodiments of a charger for batteries in accordance with the present invention which has been set out by way of example, not by way of limitation. It is to be appreciated that numerous other embodiments and variants are possible without departing from the spirit and scope of the present invention, its scope being defined by the appended claims.

What is claimed is:

1. In a charger for batteries, the combination of a charging station including a housing having a longitudinal recess formed therein, a casing having an interior and which is to hold at least one battery to be charged or recharged adapted to be received within the recess, an upwardly projecting boss on the housing of the charging station above the recess, a laterally-projecting guide carried by the casing, the laterally-projecting guide having an open bottom end and being adapted to be supported on the upwardly-projecting boss on the housing of the charging station, thereby removably supporting the casing on the housing of the charging station, a lid pivotably mounted on the casing, wherein the lid can be pivoted to allow individual batteries to be inserted into or removed from the casing, means including an element on the housing of the charging station and cooperating with the pivotally mounted lid on the casing to prevent the lid from being pivoted sufficiently whenever the casing is received and supported within the recess thereby precluding access to the interior of the casing when the casing is mounted and supported on the housing of the charging station within the recess, and electrical connection means between the housing of the charging station and the interior of the casing and including electrcial contacts within the respective boss and guide.

2. A battery charger comprising a charging station and, a casing adapted to receive a plurality of rechargable batteries and including an innermost battery the casing having an interior and an open end through which batteries to be charged or recharged may be inserted into and be removed one after another from the casing, a lid pivotally mounted on casing and adapted to close the open end of the casing, the lid having a closed position and a fully open position, first resilient means constantly urging the pivoted lid to its closed position, second resilient means within the interior of the casing and constantly urging batteries when present in a direction outwardly of the casing, said second resilient means including a free end adapted to contact an end of the innermost battery when present, respective means cooperating between the casing and the lid and adapted to removably retain the lid in an intermediate position between its fully open and closed position thereby preventing the batteries from being fully and inadvertently ejected out of the casing by the second resilient means when the lid is moved away from its closed position towards its fully open position, wherein when any present battery is being manually removed from the casing, the first resilient means moves the lid into its intermediate position in detented engagement with the casing, and wherein in its intermediate position, the lid automatically engages a portion of a next battery if present in the casing to preclude its inadvertent ejection out of the casing, means on the charging station and on the casing for removably positioning the casing on the charging station, and electrical means for providing charging current to batteries within the casing, said means providing charging current including electrical connection means between the charging station and the interior or the casing.

3. In a battery charger, the combination of a charging station including a housing, a substantially longitudinal casing adapted to receive a plurality of rechargable batteries, the batteries including an innermost battery having a rearward end portion, means for removably supporting the casing on the housing of the charging station, cooperating electrical connection means between the housing of the charging station and the casing, respectively, a substantially constant tension spring within the casing for constantly urging the batteries when present out of the casing, means electrically connecting a first portion of the spring to the electrical connection means on the casing, and the spring further including a coiled second portion formed intergrally with the first portion of the spring and disposed against the end of the innermost battery when present within the casing.

4. A battery charger comprising a charging station and a casing having an interior and an open end through which the casing is adapted to receive a plurality of rechargable batteries including an innermost battery, a substantially constant tension spring within the interior of the casing for constantly urging the batteries out of the casing, a movable lid on the casing and having an open position and a closed position over the open end of the casing, resilient means constantly urging the lid to its closed position, detent latching means between the lid and the casing for retaining the lid in intermediate position between its open and closed positions, thereby precluding all of the batteries when present from being inadvertently ejected out of the casing, but facilitating the selective removal of an individual battery out of the casing, means on the charging station and on the casing for removably positioning the casing on the charging station, and electrical means for providing charging current to batteries when present within the casing, said means for providing charging current including electrical connection means between the charging station and the interior of the casing.

5. In a battery charger, the combination of a charging station including a housing, a substantially longitudinal casing having an open end through which the casing is adapted to receive a plurality of rechargable batteries, means for removably supporting the casing on the charging station housing, cooperative electrical connection means between the charging station housing and the casing, respectively, a substantially constant tension spring within the casing, closure means for the open end of the casing and having a fully open position, an intermediate position and a closed position, latching means on the closure means for precluding batteries when present from being inadvertently ejected out of the casing when the closure means is in its intermediate position, removal of batteries out of the casing one at a time being possible when the closure means is moved from its intermediate position to its fully open position, and interlock means cooperating between the casing and the charging station housing and precluding the closure means from being moved to its fully open position, when the casing is supported on the charging station housing, to preclude access to interior of the casing.

6. A battery charger comprising a charging station and a tubular casing removably positionable on the charging station and having an open end adapted to receive a plurality of rechargeable batteries including an innermost battery having a rearward end portion, resilient means within the tubular casing and including a first substantially flat portion and a second coiled portion integral with the first portion end engaging the end of the innermost battery when present for constantly urging the batteries in a direction outwardly of the casing, closure means for the open end of the casing and having a fully open position, an intermediate position and a closed position, latching means on the closure means for precluding the plurality of batteries when present from being fully ejected out of the casing when the closure means is in its intermediate position and allowing selective removal of batteries individually out of the casing one at a time when the closure means is moved between its intermediate position and its fully open position, and means preventing access to interior of the casing when the casing is present on the charging station.

7. The battery charger according to claim 3, wherein the second resilient means is composed of electrically conductive material.

8. The battery charger according to claim 3, wherein the second resilient means is an electrically conductive, metallic, substantially constant tension spring.

9. A combination comprising a hollow casing adapted to be supported on a charging station and to receive a plurality of rechargeable batteries including an innermost battery, the casing having an interior and an open end through which batteries to be charged or recharged may be inserted into and be removed one after another from the casing, a lid pivotally mounted on casing and adapted to close the open end of the casing, the lid having a closed position and a fully open position, first resilient means constantly urging the pivotally mounted lid to its closed position, second resilient means within the interior of the casing and constantly urging batteries when present in a direction outwardly of the casing, said second resilient means including a free end adapted to contact an end of the innermost battery when present, respective means cooperating between the casing and the lid and adapted to removably retain the lid in an intermediate position between its fully open and closed positions thereby preventing the batteries from being fully and inadvertently ejected out of the casing by the second resilient means when the lid is moved away from its closed position toward its fully open position, wherein when any present battery is being manually removed from the casing, the first resilient means moves the lid into its intermediate position in detented engagement with the casing, and wherein in its intermediate position, the lid automatically engages a portion of a next battery if present in the casing to preclude its inadvertent ejection out of the casing, and electrical connection means for conducting charging current to batteries within the casing when the casing is supported on a charging station.

10. A combination comprising a casing adapted to be supported on a charging station and having an interior and an open end through which the casing is adapted to receive a plurality of rechargeable batteries including an innermost battery, a substantially constant tension spring within the interior of the casing for constantly urging the batteries out of the casing, a movable lid on the casing and having an open position and a closed position over the open end of the casing, resilient means constantly urging the lid to its closed position, detent latching means between the lid and the casing for retaining the lid in an intermediate position between its open and closed positions, thereby precluding all of the batteries from being inadvertently ejected out of the casing, but facilitating the selective removal of an individual battery out of the casing, and electrical means for conducting charging current to batteries when present within the casing when the casing is supported on a charging station.

11. A combination comrpising a tubular casing removably positionable on a charging station and having an open end adapted to receive a plurality of rechargeable batteries including an innermost battery having a rearward end portion, resilient means within the tubular casing and including a first substantially flat portion and a second coiled portion integral with the first portion end engaging the end of the innermost battery when present for constantly urging the batteries when present in a direction outwardly of the casing, closure means for the open end of the casing and having a fully open position, an intermediate position and a closed position, latching means on the closure means for precluding the plurality of batteries when present from being fully ejected out of the casing when the closure means is in its intermediate position and allowing selective removal of battieries individual out of the casing one at a time when the closure means is moved between its intermediate position and its fully open position, and means preventing access to interior of the casing when the charger casing is present on a charging station.

* * * * *